P. AND B. DE MATTIA.
TIRE BUILDING CORE AND CHUCK.
APPLICATION FILED MAY 6, 1919.

1,323,165.

Patented Nov. 25, 1919.
2 SHEETS—SHEET 1.

WITNESSES

INVENTORS
PETER DE MATTIA
BARTHOLD DE MATTIA
BY
ATTORNEYS

P. AND B. DE MATTIA.
TIRE BUILDING CORE AND CHUCK.
APPLICATION FILED MAY 6, 1919.

1,323,165.

Patented Nov. 25, 1919.
2 SHEETS—SHEET 2.

WITNESSES

INVENTORS
PETER DE MATTIA
BARTHOLD DE MATTIA
BY
ATTORNEYS

UNITED STATES PATENT OFFICE.

PETER DE MATTIA AND BARTHOLD DE MATTIA, OF CLIFTON, NEW JERSEY.

TIRE-BUILDING CORE AND CHUCK.

1,323,165.        Specification of Letters Patent.      Patented Nov. 25, 1919.

Application filed May 6, 1919. Serial No. 295,197.

*To all whom it may concern:*

Be it known that we, PETER DE MATTIA and BARTHOLD DE MATTIA, both citizens of the United States, and residents of Clifton, in the county of Passaic, State of New Jersey, have invented a new and improved Tire-Building Core and Chuck, of which the following is a full, clear, and exact description.

The present invention relates to tire building core and chuck of the type set forth in our co-pending application filed January 30, 1919, Serial No. 274,014, in which is shown and described a collapsible core formed of a plurality of segmental sections supported upon a chuck so that the sections of the core may be moved with relation to each other and collapsed to facilitate their withdrawal from the pneumatic tire shoe which has been constructed thereon.

The object of the present invention is to produce a collapsible core so constructed as to provide an increased and greater freedom of movement of the collapsible sections to facilitate their more complete withdrawal from the shoe.

The present invention is illustrated in the accompanying drawing in which—

Figure 1:
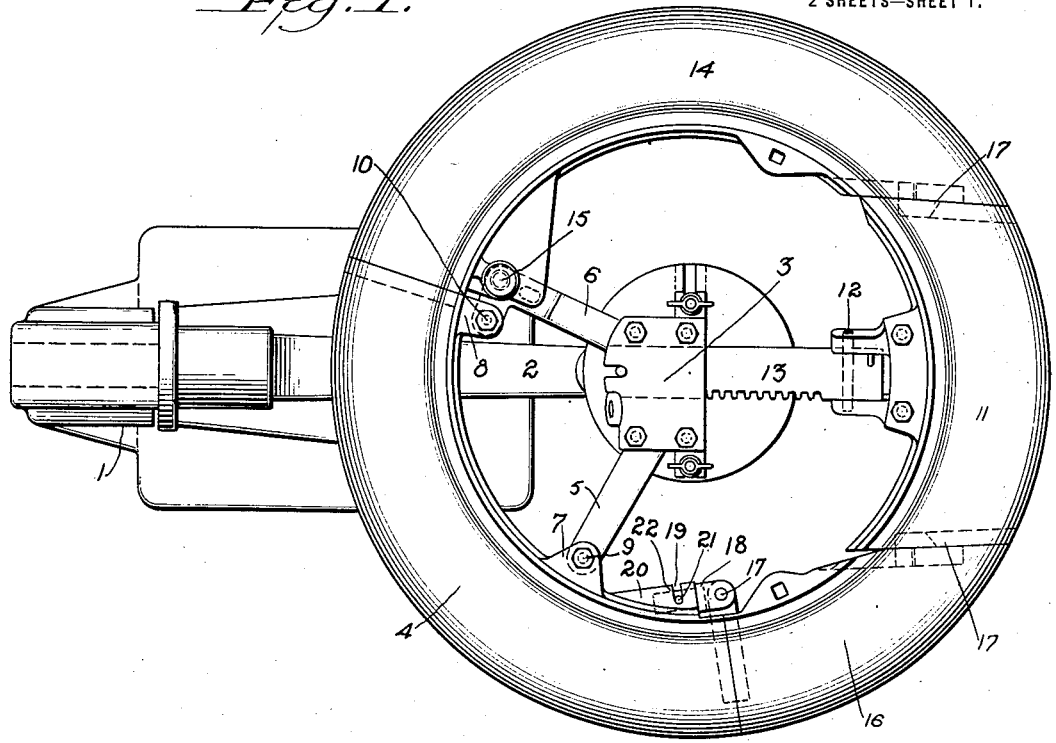
Figure 1 is a top plan view.
Figure 2:
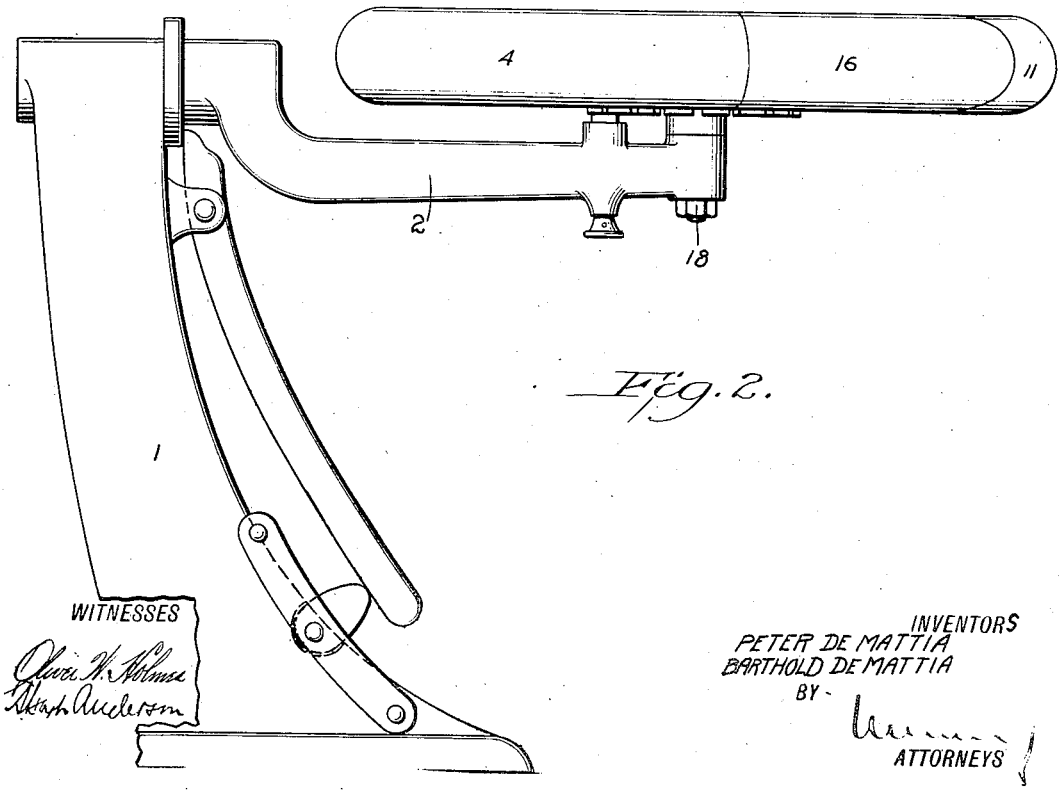
Fig. 2 is a side elevation.

In our copending application the collapsible core is shown and described in two forms, in one of which there are three sections, one of which is mounted to have a radial movement so as to remove and replace it with relation to the two other sections of the core, and in addition thereto it has a pivotal movement with relation to its support so that it may be raised or lowered with relation to the plane of the other sections. One section is fixedly secured on its support and the other section has a swinging movement in the plane of the core toward and from the fixed section. In the other form in which there are four sections, there are two diametrically arranged with relation to each other which have a movement toward and from each other and also a swinging movement, and of the other two sections one is fixedly mounted and the other arranged to move in the plane of the core toward and from the fixed section.

In the present invention we make the core in four sections and so constructed as to provide for an increased movement and a more effective collapsing of the core, more particularly as regards the relatively large movable segmental section.

The stand or jack 1, the bracket arm 2 and the chuck 3 may be, and preferably are, of the same type and form as that shown in our copending application.

The collapsible core comprises a fixed segmental section 4 which is supported by the radial arms 5 and 6 forming part of the chuck 3. For this purpose the section 4 is provided with lugs 7 and 8 which are bolted at 9 and 10 to the radial arms 5 and 6 respectively. The core is provided with a key section 11 which is pivotally mounted at 12 to a rack bar 13 forming a part of the chuck 3 and arranged to reciprocate radially through a suitable guide in said chuck, whereby the key section 11 is movable into and out of alinement with the core sections and also whereby it may be moved upwardly about its pivot 12 to place it in a plane about the plane of movement of the pivoted sections.

Figure 3:
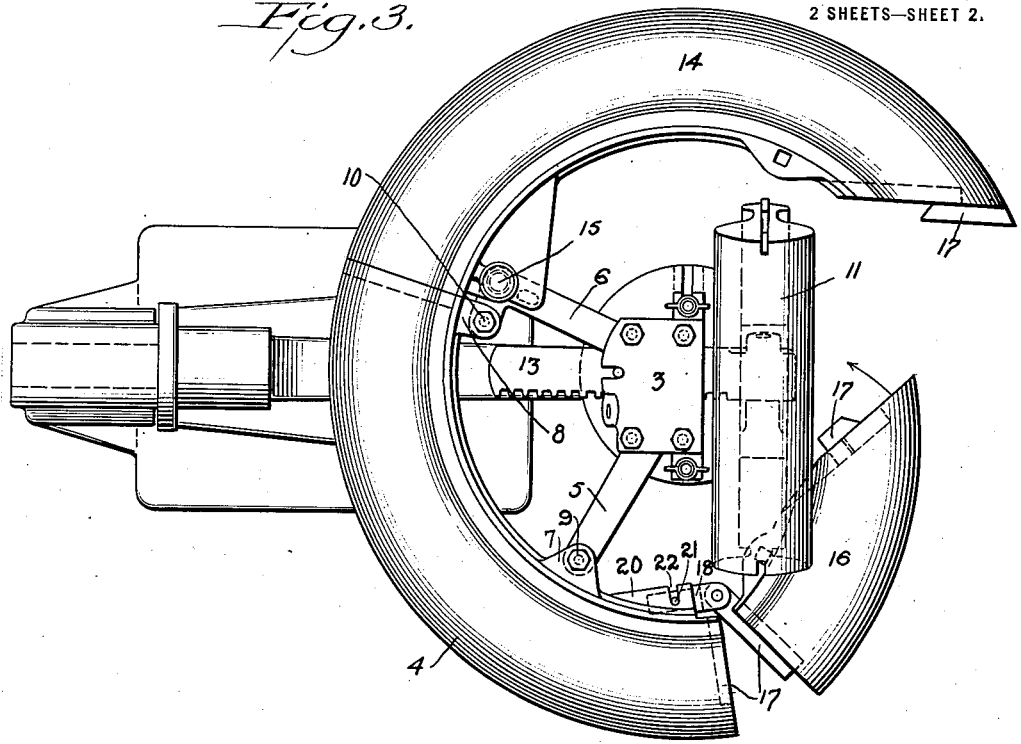
Fig. 3 is a top plan view showing the core partially collapsed.
Figure 4:
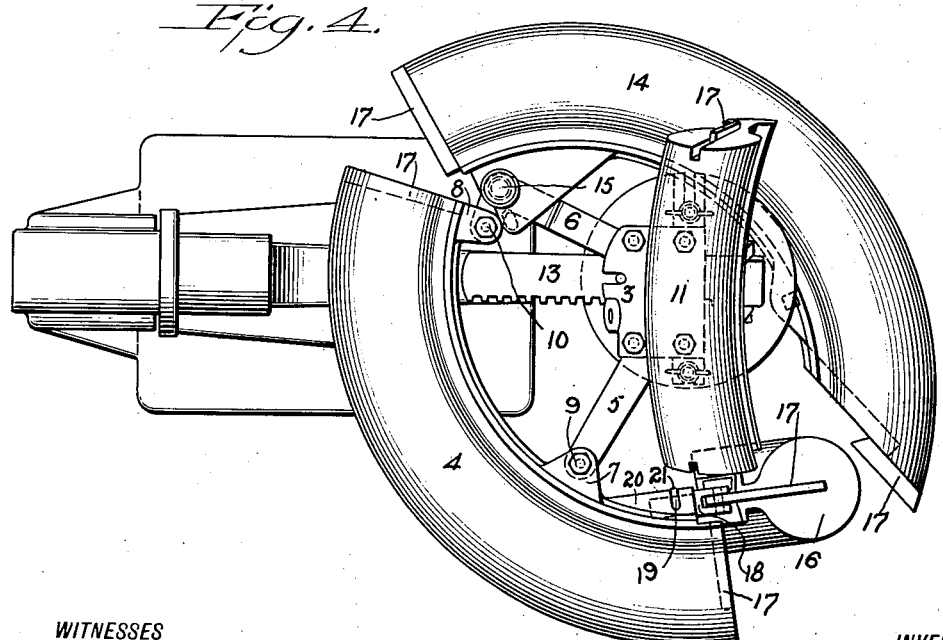
Fig. 4 is a top plan view showing the core completely collapsed.

One of the pivoted sections 14 is pivotally mounted at 15 to the radial arm 6 of the chuck 3 whereby, when the key section 11 is moved inward and rocked upwardly as shown in Fig. 4, the pivoted section 14 may be rocked about its pivot from the position shown in Fig. 3 to that shown in Fig. 4. It is desirable that the pivotal section 14 shall have the maximum amount of inward swinging pivotal movement and for this purpose the relatively small segmental section 16 is pivotally mounted at 17 to a swivel stud 18. The stud 18 carries a shank 19 which is received in a bearing 20 formed upon the fixed segmental section 4, the shank 19 being provided with a stud 21 which operates through a slot 22 in the bearing 20 so as to retain the swivel stud 18 within the bearing 20 and forming a stop to limit its swiveling movement therein. The arrangement is such that as shown in Fig. 4, when the section 16 is moved inward about its pivotal point 17, it may thereafter be given a swiveling movement permitting it to drop below the plane of the core, thus providing greater clearance for the end of the segmental section 14 and permitting section 14 to move inwardly to effect its withdrawal from the tire shoe to such an extent that the removal of the shoe from the fixed section 4 is greatly assisted. The meeting ends of the core sections may be provided with complementary splines and grooves 17, as fully described in our copending application. Also, the chuck 3 and the collapsible core will be pivotally mounted as at 18 to the forward end of the bracket arm 2, whereby it may be revolved. As the present invention however, relates only to the sectional core, it is unnecessary to fully describe the other details of construction of the jack and chuck.

In operation, the core sections having been adjusted as shown in Fig. 1, to form a complete core, the tire shoe is built up thereon in the usual manner. When the shoe has been completely built up the core is withdrawn therefrom by first withdrawing the key section 11. Thereafter, the section 16 is turned about its pivot 17 causing its outer end to swing inwardly toward the center of the chuck, after which, by turning the swivel pin in its bearing, section 16 will be placed in a dependent position as shown in Fig. 4. This removes it entirely out of the path of movement of the pivoted section 14, which can then be swung inward about its pivot 15 to such an extent as to almost completely remove it from the shoe and after this has been done, it is a simple matter to remove the shoe from the fixed section 4.

Having described our invention, we claim:

1. In a tire building apparatus, in combination, a chuck or support and a collapsible core mounted thereon composed of a plurality of core sections, one of the core sections being fixedly mounted and a movable core section pivotally supported to one end of the fixed core section for movement about axes disposed at an angle to each other.

2. In a tire building apparatus, in combination, a chuck or support and a collapsible core mounted thereon composed of a plurality of core sections, one of the core sections being radially movable and an adjacent core section pivotally supported for movement about axes disposed at an angle to each other.

3. In a tire building apparatus, in combination, a chuck or support and a collapsible core mounted thereon composed of a plurality of core sections, one of the core sections being fixedly mounted; a core section pivotally mounted to have a swinging movement in the plane of the fixed core section, a core section pivotally mounted for movement about axes disposed at an angle to each other and a radially movable core section.

4. In a tire building apparatus, in combination, a chuck or support and a collapsible core mounted thereon composed of a plurality of core sections, one of the core sections being fixedly mounted on the support; a radially movable core section and pivoted core sections interposed between the fixed core section and the radially movable core section, one of the pivoted core sections being movable about axes disposed at an angle to each other and complementary interlocking connections between the meeting ends of adjacent core sections.

PETER DE MATTIA.
BARTHOLD DE MATTIA.

Witness:
MILES C. WHITEHEAD.